United States Patent
Takiguchi

[19]
[11] Patent Number: 6,041,275
[45] Date of Patent: *Mar. 21, 2000

[54] AUTOMATIC TRANSMISSION UPSHIFT CONTROL APPARATUS

[75] Inventor: Masahiro Takiguchi, Shizuoka, Japan

[73] Assignee: Jatco Corporation, Fuji, Japan

[*] Notice: This patent is subject to a terminal disclaimer.

[21] Appl. No.: 08/990,844

[22] Filed: Dec. 15, 1997

[30] Foreign Application Priority Data

Dec. 19, 1996 [JP] Japan ................................. 8-339229

[51] Int. Cl.⁷ ............................ B60K 28/16; F16H 61/08
[52] U.S. Cl. ............................ 701/55; 701/64; 475/120; 477/109
[58] Field of Search ................................ 701/51, 54, 55, 701/64, 66; 477/34, 109, 110, 108, 107, 117, 151; 475/120

[56] References Cited

U.S. PATENT DOCUMENTS

| | | | |
|---|---|---|---|
| 4,667,540 | 5/1987 | Yagi ........................................ | 701/60 |
| 4,729,265 | 3/1988 | Sugano .................................... | 477/150 |
| 5,003,842 | 4/1991 | Hatta et al. ............................. | 477/154 |
| 5,018,068 | 5/1991 | Aoki et al. .............................. | 701/53 |
| 5,027,676 | 7/1991 | Fujiwara et al. ........................ | 477/158 |
| 5,207,122 | 5/1993 | Minagawa ................................ | 74/866 |
| 5,489,248 | 2/1996 | Tazawa .................................... | 477/148 |
| 5,583,768 | 12/1996 | Hamajima et al. ....................... | 701/53 |

FOREIGN PATENT DOCUMENTS

| | | |
|---|---|---|
| 1-113655 | 7/1989 | Japan . |
| 4-211760 | 8/1992 | Japan . |
| 5-263902 | 10/1993 | Japan . |

*Primary Examiner*—Michael J. Zanelli
*Attorney, Agent, or Firm*—Foley & Lardner

[57] ABSTRACT

An upshift control apparatus for use in an automatic transmission having first and second torque transmitting elements operable on fluid pressure between engaged and released conditions for controlling at least the fluid pressure to the second element to an initial value to engage the second element to effect an upshift from a current gear ratio to a higher traget gear ratio while releasing the first element without the use of a one-way clutch to release the first element while synchronizing rotation. Engine racing is detected after an upshift is detected when the detected gear ratio is equal to or greater than a threshold value greater than a gear ratio existing before the upshift. The fluid pressure supplied to the second element is increased to prevent the engine racing when the engine racing is detected at the early stage of the upshift before the inertia phase of the upshift starts.

9 Claims, 8 Drawing Sheets

|  | R/C | H/C | 2-4/B | L/C | L&R/B | LOW O.W.C |
|---|---|---|---|---|---|---|
| 1st |  |  |  | ○ | ○ | ⊘ |
| 2nd |  |  | ○ | ○ |  |  |
| 3rd |  | ○ |  | ○ |  |  |
| 4th |  | ○ | ○ |  |  |  |
| Rev | ○ |  |  |  | ○ |  |

| GEAR POSITION \ SOLENOID | FIRST SHIFT SOLENOID | SECOND SHIFT SOLENOID |
|---|---|---|
| 1st | ON | ON |
| 2nd | OFF | ON |
| 3rd | OFF | OFF |
| 4th | ON | OFF |

AUTOMATIC TRANSMISSION UPSHIFT CONTROL APPARATUS

BACKGROUND OF THE INVENTION

This invention relates to an upshift control apparatus for controlling friction elements used in an automatic transmission to prevent engine racing, particularly, at an early stage of upshifting. The term "upshift" as used throughout this invention is intended to mean "shifts from a given gear ratio to a higher gear ratio".

Automatic transmission upshift control apparatus have been proposed, for example, in Japanese Patent Kokai No. 4-211760 and 5-263902 and Japanese Utility Model Kokai No. 1-113655.

Figure 9:
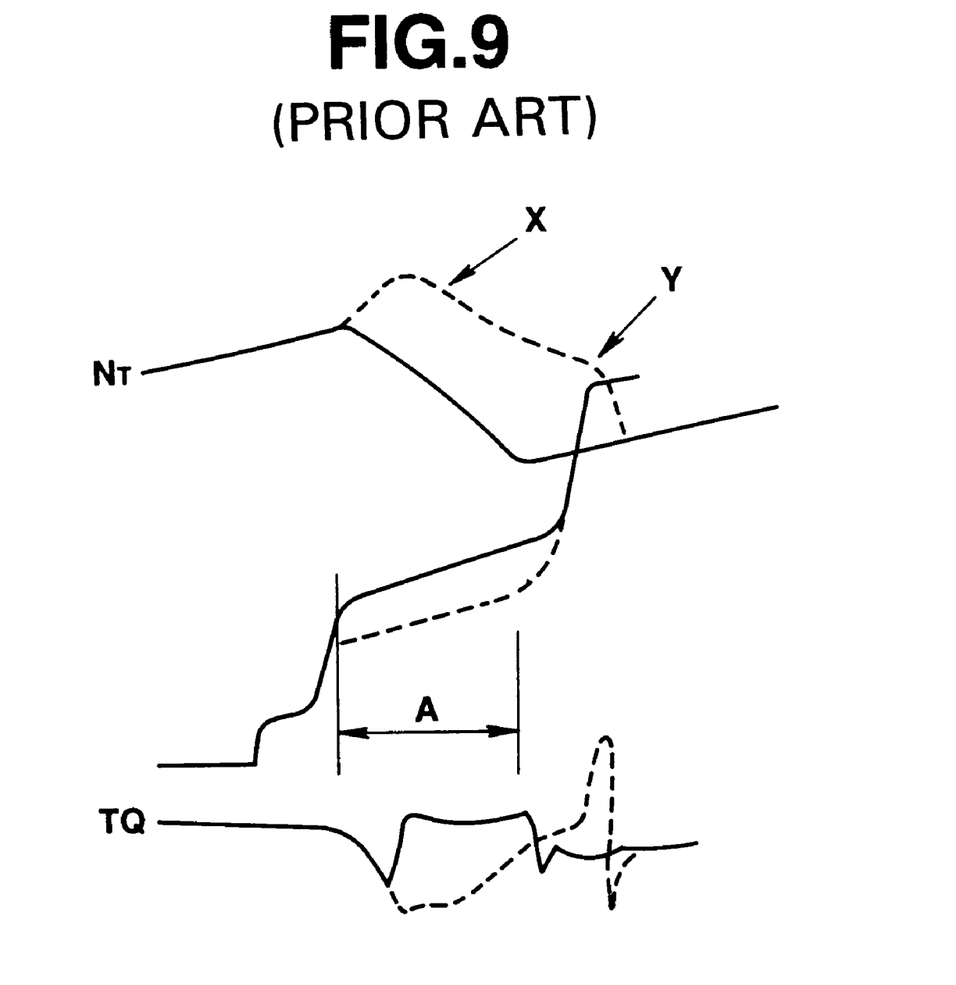
FIG. 9 contains graphs showing the transient characteristics of turbine speed, applied pressure and output shaft torque during a 2-3 upshift effected in the conventional upshift control apparatus.

Japanese Patent Kokai No. 4-211760 and 5-263902 disclose upshift control apparatus arranged to prevent engine racing by increasing the fluid pressure to the friction element to be released during upshifting. However, these apparatus cannot prevent engine racing resulting from an insufficient torque capacity of the apply element although they can prevent engine racing resulting from an insufficient torque capacity of the release element. The apply element may have an insufficient torque capacity when the fluid pressure decreases because of fluid pressure variations, the apply element has a friction coefficient reduced, or the torque increases because of engine torque variations. The insufficient torque capacity of the apply element will result in engine racing to provide a degraded shift feel, a degraded acceleration performance, an increase in the time required for the upshift, and a "shelf-off" shock. In Japanese Patent Kokai No. 4-211760 and 5-263902, it is proposed to suppress engine racing in the range A of FIG. 9 by increasing the releasing pressure of the release element. When the releasing pressure is increased, however, a torque drop occurs due to such interlock that the releasing and engaging pressure overlaps each other. In FIG. 9, the character X indicates "engine racing" and the character Y indicates "shelf-off".

Figure 10A:
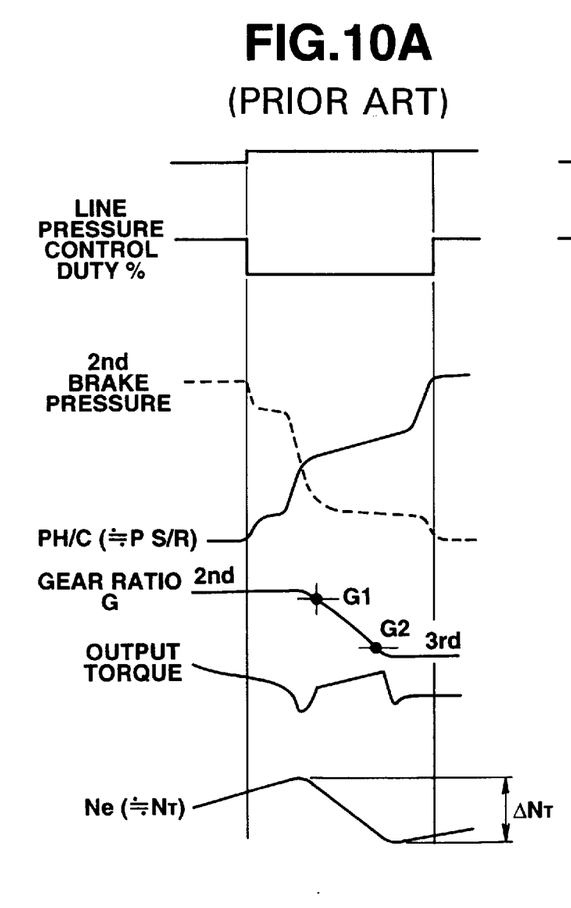
FIG. 10A contains graphs showing the transient characteristic of various conditions monitored in an automatic transmission during a 2-3 upshift effected normally in the conventional shift control apparatus.
Figure 10B:
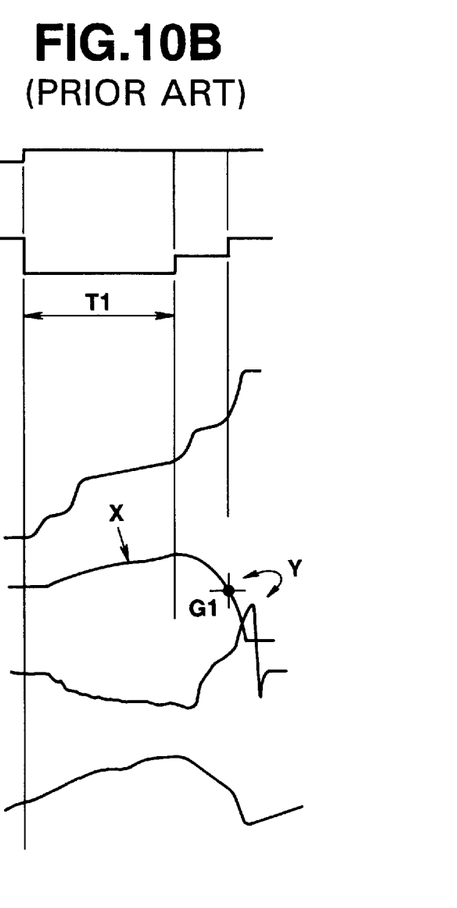
FIG. 10B contains graphs showing the transient characteristics of various conditions monitored in an automatic transmission during a 2-3 upshift effected, with engine racing, in the conventional shift control apparatus.

Japanese Utility Model Kokai No. 1-113655 discloses an upshift control apparatus which includes an inertia phase start detecting means for detecting the start of a gear ratio change to a target gear ratio, and a line pressure adjusting means for outputting a command to increase the line pressure during shifting if the inertia phase is not started after a predetermined time has been elapsed. However, such a conventional upshift control apparatus cannot solve the following problems: First, it is impossible to provide a feedback control so as to suppress the detected engine racing in a real-time fashion. Secondly, it is impossible to improve the shift quality if a touble occurs in the early stage of the shift operation before the inertia phase starts since the control to increase the fluid pressure becomes effective only after the start of the intertia phase is detected. For example, when engine racing occurs in the interval between the time at which the shift operation starts and the time at which the inertia phase is detected, the inertia change $\Delta N_T$ and output torque increase to increase the tendency toward "shelf-off" even though the line pressure is increased a predetermined time T1 after the start of the shift operation, as shown in FIGS. 10A and 10B. In FIGS. 10A and 10B the character X indicates "engine racing" and the character Y indicates "shelf-off".

SUMMARY OF THE INVENTION

This invention is directed to an upshift control apparatus arranged to effect an upshift in an automatic transmission from a current gear ratio to a target gear ratio by releasing a first friction element, without the use of a one-way clutch to release the first element while synchronizing rotation, and engaging a second friction element.

It is one object of the invention to provide such an upshift control apparatus which can suppress engine racing in the early stage of upshift operation to minimize shock and provide a good shift feel during shifting.

Another object of the invention is to provide such an upshift control apparatus which can prevent engine racing from the start of the upshift operation subsequent to an upshift operation of the same mode where the engine racing prevention control was made.

Another object of the invention is to provide such an upshift control apparatus which can provide an appropriate engine racing prevention control according to whether the apply or release element has an insufficient torque capacity.

Another object of the invention is to provide such an upshift control apparatus which can increase the engaging pressure at a rapid response rate during the engine racing prevention control.

Still another object of the invention is to provide such an upshift control apparatus which can applied to a system where a single control means is used to control all of the friction elements and can suppress engine racing resulting from an insufficient torque capacity of a release element when a learned engaging pressure adjustment is effected.

There is provided, in accordance with the invention, an upshift control apparatus for use in an automatic transmission having an input shaft drivingly coupled to an engine and first and second torque transmitting elements operable on fluid pressure between engaged and released conditions for controlling at least the fluid pressure to the second element to an initial value to engage the second element to effect an upshift from a current gear ratio to a higher traget gear ratio while releasing the first element without the use of a one-way clutch to release the first element while synchronizing rotation. The upshift control apparatus comprises means for detecting an upshift in the transmission, means for detecting the gear ratio changing during the upshift, means operable after the upshift is detected for detecting engine racing when the detected gear ratio is equal to or greater than a threshold value greater than a gear ratio existing before the upshift, and engine racing prevention means for increasing the fluid pressure supplied to the second element to prevent the engine racing when the engine racing is detected at an early stage of the upshift before an inertia phase of the upshift.

BRIEF DESCRIPTION OF THE DRAWING

This invention will be described in greater detail by reference to the following description taken in connection with the accompanying drawings, in which.

DETAILED DESCRIPTION OF THE INVENTION

Figure 1:
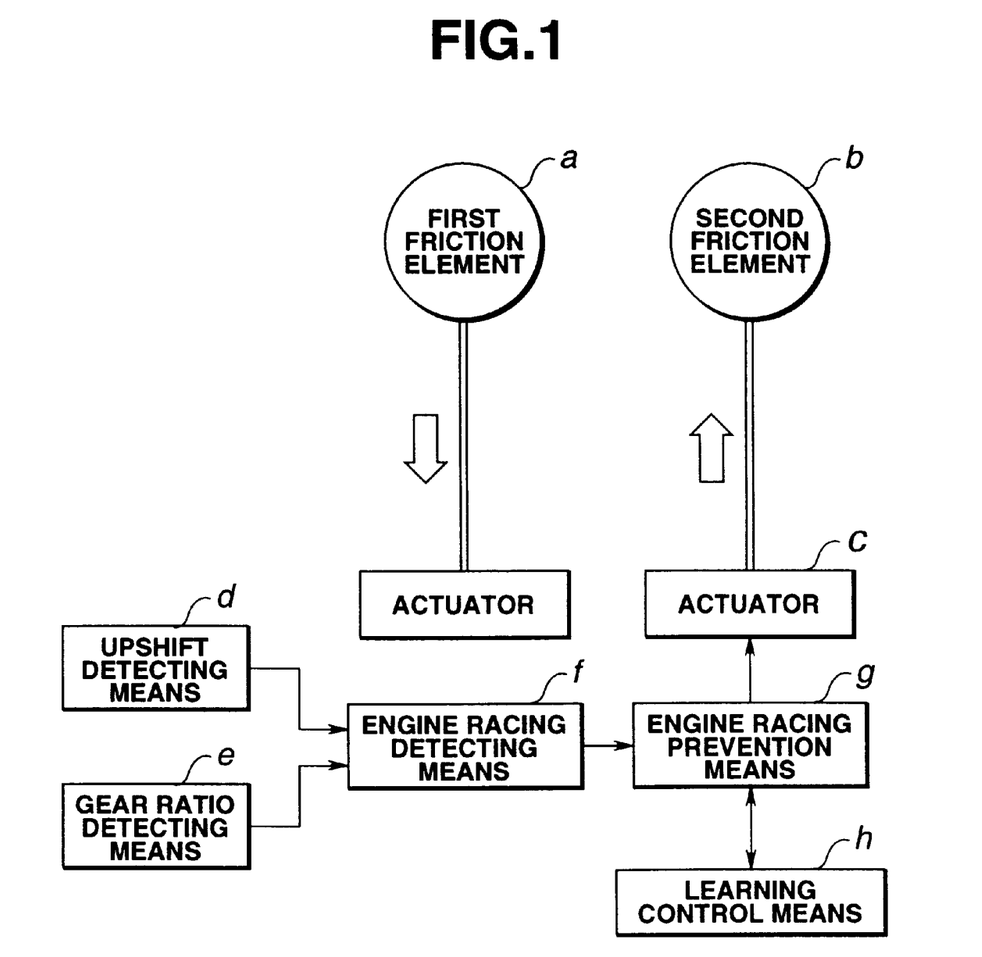
FIG. 1 is a schematic block diagram showing a basic arrangement of an upshift control apparatus made in accordance with the invention.

With reference to the drawings and in particular to FIG. 1, there is shown a schematic block diagram of an upshift control apparatus made in accordance with the invention. The upshift control apparatus is intended for use with an automatic transmission including first and second torque transmitting elements (a) and (b) operable on fluid pressure between engaged and released conditions for controlling at least the fluid pressure supplied from an actuator (c) to the second element (b) to an initial value to engage the second element to effect an upshift from a current gear ratio to a higher traget gear ratio while releasing the first element without the use of a one-way clutch to release the first element while synchronizing rotation. The upshift control apparatus includes an upshift detecting means (d) for detecting an upshift in the transmission, a gear ratio detecting means (e) for detecting the gear ratio changing during the upshift, an engine racing detecting means (f) operable after the upshift is detected for detecting engine racing when the detected gear ratio is equal to or greater than a threshold value greater than a gear ratio existing before the upshift, and an engine racing prevention means (g) for increasing the fluid pressure supplied to the second element to prevent the engine racing when the engine racing is detected at an early stage of the upshift before an inertia phase of the upshift. Preferably, the upshift control apparatus includes a learning control means (h) for adding an increase to the initial value to update the initial value after the upshift is completed when the fluid pressure supplied to the second element is increased to prevent the engine racing.

Figure 2:
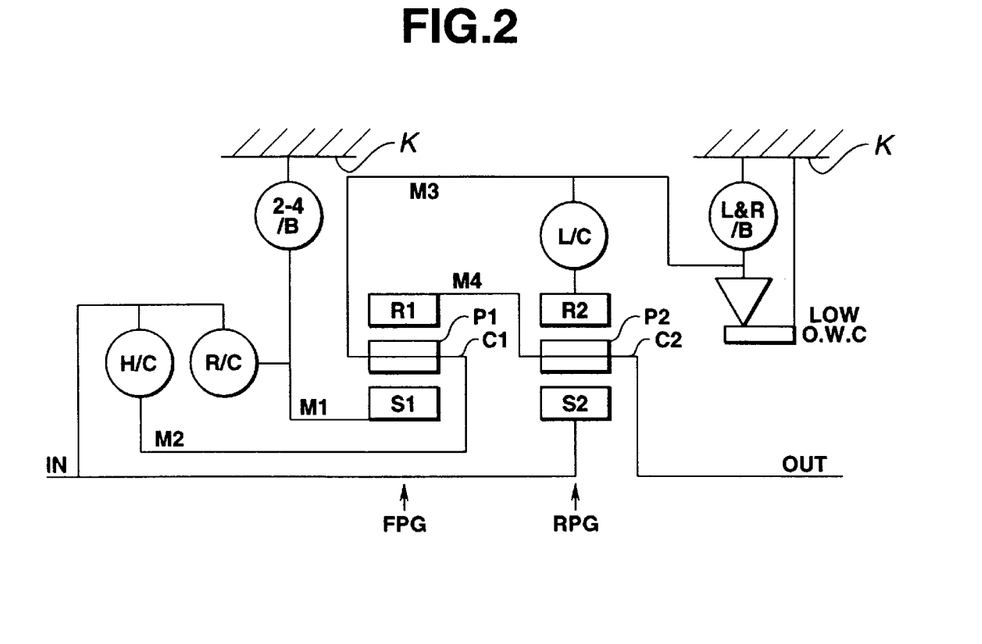
FIG. 2 is a schematic diagram showing a gear train included in an automatic transmission to which the invention is applicable.

Referring to FIG. 2, there is shown a gear train GT used in the automatic transmission. A drive from an engine is transmitted to the gear train GT through a torque converter (not shown). The gear train GT includes front and rear planetary gear units FPG and RPG arranged in tandem with each other. The front planetary gear unit FPG has a first sun gear S1, a first ring gear R1, a first pinion gear P1 and a first pinion carrier C1. The rear planetary gear unit RPG has a second sun gear S2, a second ring gear R2, a second pinion gear P2 and a second pinion carrier C2. The gear train GT also has various friction elements (torque transmitting elements) including a reverse clutch R/C, a high clutch H/C, a low clutch L/C and a high clutch H/C. The first sun gear S1 is connected through a first rotary member M1 to the reverse clutch R/C and hence to the input shaft IN of the automatic transmission. The first pinion carrier C1 is connected through a second rotary member M2 and hence to the input shaft IN and also through a third rotary member M3 to the low clutch L/C and hence to the second ring gear R2. The first ring gear R1 is connected through a fourth rotary member M4 to the second pinion carrier C2 which is connected directly to the output shaft OUT of the automatic transmission. The second sun gear S2 is connected directly to the input shaft IN. The friction elements also include a 2-4 brake 2-4/B for fixing the first sun gear S1 through the first rotary member M1 to a grounded or stationary member such as the transmission case K, a low and reverse brake L&R/B for fixing the first pinion carrier C1 through the third rotary member M3 to the transmission case K, and a one-way clutch LOW/O.W.C provided between the first pinion carrier C1 and the transmission case K. The one-way clutch LOW/O.W.C is connected in parallel with the low and reverse clutch L&R/B. The 2-4 brake 2-4/B is a multi-plate brake like multi-plate clutches. The gear train GT is arranged to reduce its size and weight by minimizing the number of friction elements required for providing good engine performance. The removed friction elements include a one-way clutch used to begin a 4-3 downshift operation at an appropriate time to realize shockless downshift operation and a clutch used, with the use of such a one-way clutch, to ensure a good engine brake effect. Each of the low clutch L/C, the high clutch H/C, the reverse clutch R/C, the low and reverse brake L&R/B and the 2-4 brake 2-4/B is operated hydraulically between its engaged or disengaged states. The one-way clutch LOW/O.W.C is operated mechanically between its engaged and disengaged states.

Figure 3:
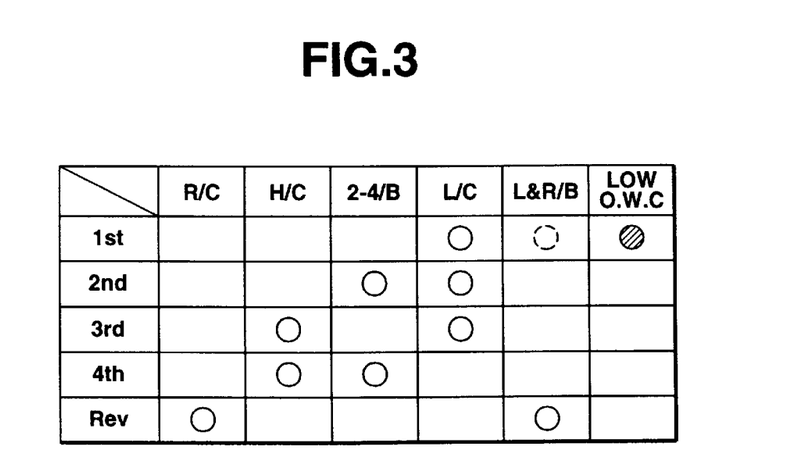
FIG. 3 is a table used in explaining the engaged and disengaged states of the friction elements illustrated in FIG. 2 to effect various gear ratio changes.

Each of the friction elements is switched between its engaged and disengaged states, as shown in FIG. 3, to provide four forward speeds and one reverse. In FIG. 3, the character ○ indicates that the corresponding friction element is engaged. The gear ratios are obtained as follows:

1st: The low clutch L/C is engaged and the low and reverse brake L&R/B is engaged to fix the second ring gear R2 when the engine brake range is selected or the one-way clutch LOW/C.W.C is engaged when the vehicle is accelerating so that the drive is transmitted from the input shaft IN to the second sun gear S2 and, in turn, through the second pinion carrier C2 to the output shaft OUT.

2nd: The low clutch L/C is engaged and the 2-4 brake 2-4/B is engaged to fix the first sun gear S1 so that the drive is transmitted from the input shaft IN to the second sun gear S2 and in turn through the second pinion carrier C2 to the output shaft OUT.

3rd: The high clutch H/C is engaged and the low clutch L/C is engaged so that the drive is transmitted from the input shaft IN to the second ring and sun gears R2 and S2 and in turn through the second pinion carrier C2 to the output shaft OUT. In this case, a 1 to 1 ratio is given.

4th: The high clutch H/C is engaged and the 2-4 brake 2-4/B is engaged to fix the first sun gear S1 so that the drive is transmitted from the input shaft IN to the first pinion carrier C1 and also to the second sun gear S2 and in turn through the second pinion carrier C2 to the output shaft OUT. In this case, an overdrive (OD) ratio is given.

Reverse: The reverse clutch R/C is engaged and the low and reverse brake L&R/B is engaged to fix the first pinion carrier C1 so that the drive is transmitted from the input shaft IN to the first and second sun gears S1 and S2 and in turn through the second pinion carrier C2 to the output shaft OUT.

Figure 4:
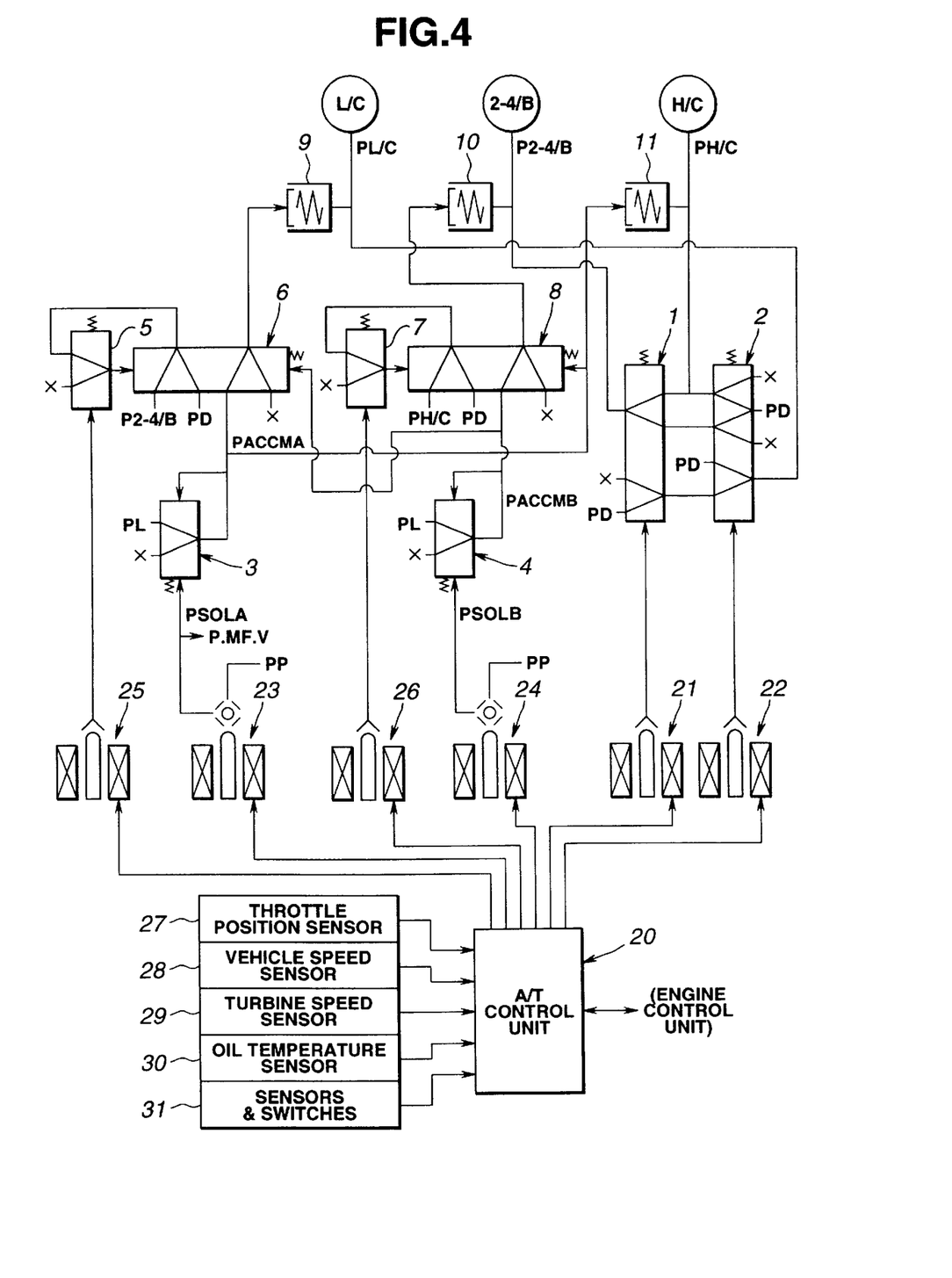
FIG. 4 is a schematic diagram showing the upshift control apparatus of the invention.

Referring to FIG. 4, there is shown a schematic diagram of a control system for operating the friction elements L/C, 2-4/B and H/C to provide 1st to 4th speeds when the drive (D) range is selected. The control system includes a first shift valve 1, a second shift valve 2, a first accumulator control valve 3, a second accumulator control valve 4, a low clutch timing valve 5, a low clutch sequence valve 6, a 2-4 brake timing valve 7, a 2-4 brake sequence valve 8, a low clutch accumulator 9, a 2-4 brake accumulator 10 and a high clutch accumulator 11. First and second shift solenoids 21 and 22 are provided to operate the first and second shift valves 1 and 2, respectively, for fluid (pressure oil) passage selection in a manner to provide one of the 1st, 2nd, 3rd and 4th gear ratio. The first accumulator control valve 3 operates to decrease the line pressure PL, according to the solenoid pressure PSOLA determined by a line pressure duty solenoid 23, so as to adjust the accumulator control pressure PACCMA. The solenoid pressure PSOLA determined by the line pressure duty solenoid 23 is also applied to a pressure modifier valve for adjusting the modifier pressure used as a signal pressure for the line pressure PL produced from a pressure regulator valve. The second accumulator control valve 4 operates to decrease the line pressure PL, according to the solenoid pressure PSOLB determined by a 2-4/B duty solenoid 24, so as to adjust the accumulator control pressure PACCMB. The low clutch timing valve 5 is operated, by a low clutch timing solenoid 25, to connect the signal pressure passage to its drain port when the low clutch timing solenoid 25 is OFF and to its outlet port connected to the low clutch sequence valve 6 when the low clutch timing solenoid 25 is ON. The low clutch sequence valve 6 controls the back pressure to the low clutch accumulator 9 when an upshift to the 4th gear ratio or a downshift from the 4th gear ratio is commanded. The 2-4 brake timing valve 7 is operated, by a 2-4 brake timing solenoid 26, to connect the signal pressure passage to its drain port when the 2-4 brake timing solenoid 26 is OFF and to its outlet port connected to the 2-4 brake sequence valve 8 when the 2-4 brake timing solenoid 26 is ON. The 2-4 brake sequence valve 8 controls the back pressure to the 2-4 brake accumulator 10 when an upshift to the 3rd gear ratio or a downshift from the 3rd gear ratio is commanded. The low clutch accumulator 9 has a back pressure chamber for receipt of the accumulator control pressure PACCMA fed thereto through the low clutch sequence valve 4 to ensure smooth engagement and disengagement of the low clutch L/C. The 2-4 brake accumulator 10 has a back pressure chamber for receipt of the accumulator control pressure PACCMB fed thereto through the 2-4 brake sequence valve 8 to ensure smooth engagement and disengagement of the 2-4 brake 2-4/B. The high clutch accumulator 11 has a back pressure chamber for receipt of the accumulator control pressure PACCMA fed thereto to ensure smooth engagement and disengagement of the high clutch H/C.

An A/T control unit 20 is provided to control the actuators, that is, the first shift solenoid 21, the second shift solenoid 22, the line pressure duty solenoid 23, the 2-4 brake duty solenoid 24, the low clutch timing solenoid 25 and the 2-4 brake timing solenoid 26, to make a gear change in the automatic transmission A/T. The A/T control unit 20 effects gear changed based upon throttle position, vehicle speed, turbine speed, oil temperature and etc. Thus, a throttle position sensor 27, a vehicle speed sensor 28, a turbine speed sensor 29 and an oil temperature sensor 30 are connected to the A/T control unit 20. The numeral 31 designates the other sensors and switches connected to the A/T control unit 20. The throttle position sensor 27 is associated with the throttle valve provided in the engine for controlling the amount of air permitted to enter the engine and it produces a voltage signal indicated of the degree to which the throttle valve opens. The vehicle speed sensor 28 may be provided at a position for sensing the speed of rotation of the transmission output shaft and it produces a signal indicative of the speed of running of the vehicle. The turbine speed sensor 29 is provided to sense the speed of rotation of the turbine. The oil temperature sensor is provided for sensing the temperature of the fluid (pressure oil) used to operate the friction elements and it produces a signal indicative of the sensed oil temperature.

Figure 5:
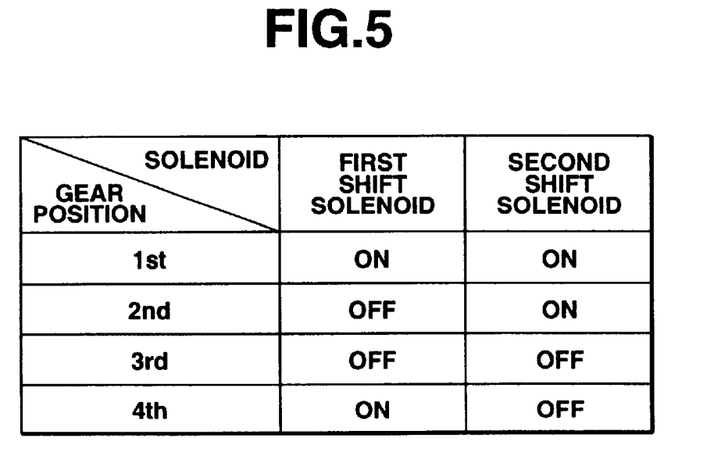
FIG. 5 is a table used in explaining the ON and OFF states of the first and second shift solenoids illustrated in FIG. 4 to effect various gear ratio changes.
Figure 6:
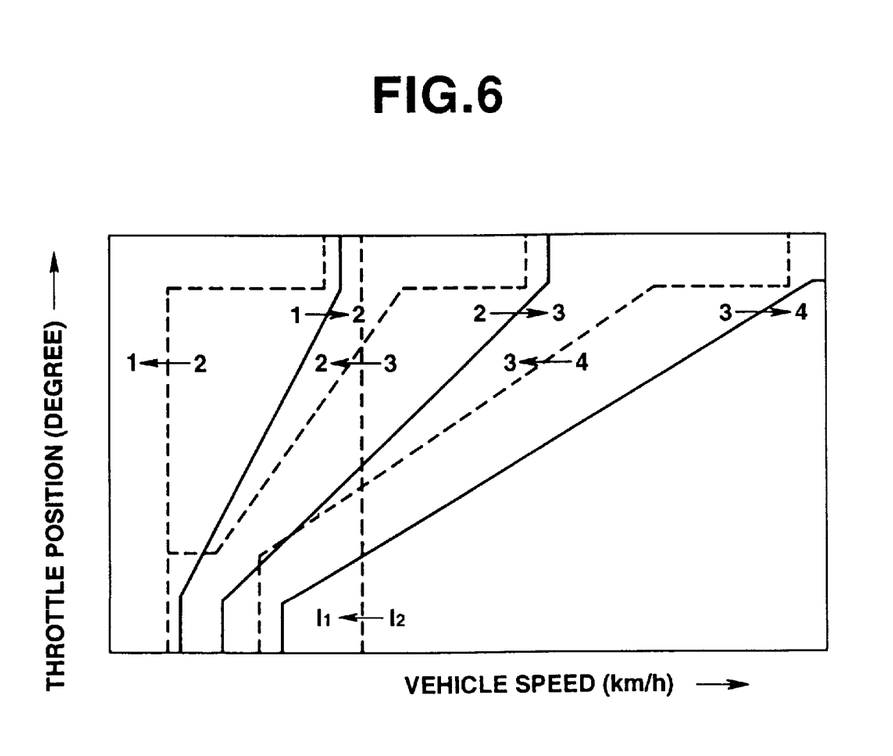
FIG. 6 is a diagram showing a shift schedule used for a shift control made in the shift control apparatus of FIG. 4.

In the illustrated embodiment, the A/T control unit 20 is arranged to make an automatic gear shift control to effect gear changes by switching ON and OFF states of the first and second shift solenoids 21 and 22, as shown in FIG. 5. For this purpose, the A/T control unit 20 employs a shift schedule table, as shown in FIG. 6, to produce an upshift command when the operation point represented by throttle valve position and vehicle speed crosses one of the upshift lines, as indicated by the solid lines of FIG. 6, and a downshift command when the operation point crosses one of the downshift lines, as indicated by the broken lines of FIG. 6. The A/T control unit 20 switches the first and second shift solenoids 21 and 22 to effect a change to the gear position determined by the upshift or downshift command.

The A/T control unit 20 employs a digital computer which includes a central processing unit (CPU), a random access memory (RAM), a read only memory (ROM), and an input/output control unit (I/O). The central processing unit communicates with the rest of the computer via data bus. The input/output control unit includes an analog-to-digital converter which receives analog signals from the various sensors and it converts the received signal into corresponding digital signals for application to the central processing unit. The read only memory contains the programs for operating the central processing unit and further contains appropriate data in look-up tables used for gear shift control.

Figure 7:
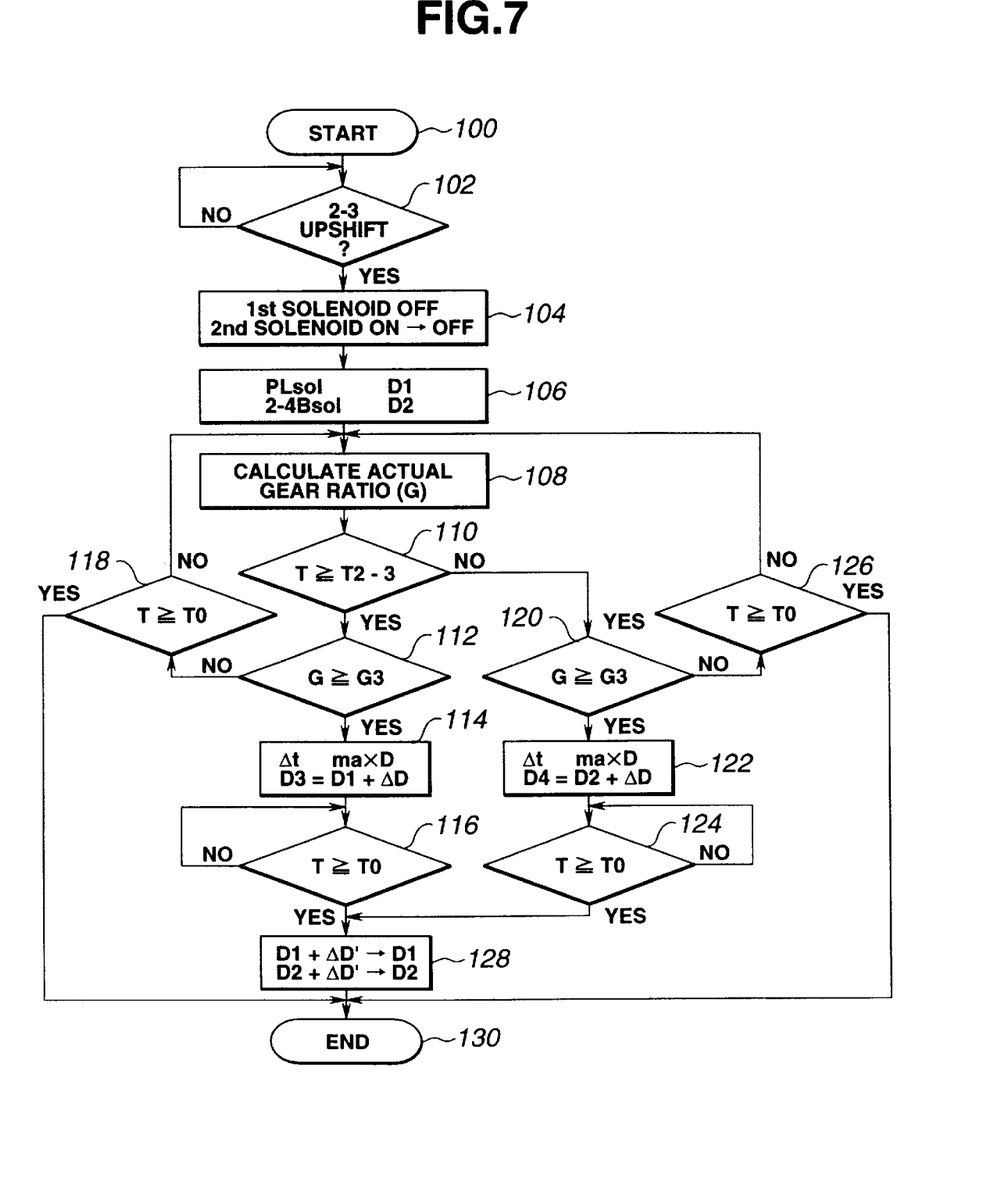
FIG. 7 is a flow diagram illustrating the programming of the digital computer as it is used for a 2-3 upshift control.

FIG. 7 is a flow diagram illustrating the programming of the digital computer as it is used to effect a 2-3 upshift. The computer program is entered at the point 100. At the point 102 in the program, a determination is made as to whether or not a 2-3 upshift command is produced. The 2-3 upshift command is produced when the operation point crosses the 2-3 upshift line (FIG. 6). If the answer to this question is "YES", then the program proceeds to the point 104. Otherwise, the program is returned to the point 102. When the 2-3 upshift command is produced, information including throttle position TH and the like required for the shift control is read and a timer is started to count clock pulses. The count T of the timer corresponds to the time elapsed after the 2-3 upshift command is produced. At the point 104, the command signal to be applied to the first shift solenoid 21 is held at its OFF state and the command signal to be applied to the second shift solenoid 22 is switched from its ON state to its OFF state. At the point 106, the duty ratio of the command signal to be applied to the line pressure duty solenoid 23 for controlling the engaging pressure to engage the high clutch H/C is set at D1, and the duty ratio of the command signal to be applied to the 2-4 brake duty solenoid 24 for controlling the releasing pressure to release the 2-4 brake 2-4/B is set at D2. At the point 108, an actual gear ratio G is calculated based on the ratio of the turbine speed (transmission input shaft speed) sensed by the turbine speed sensor 29 to the vehicle speed (transmission output shaft speed) sensed by the vehicle speed sensor 28.

At the point 110 in the program, a determination is made as to whether or not the count T of the timer is a reference value $T_{2-3}$. The reference value $T_{2-3}$, which is the interval between the time at which the gear shift is initiated and the time at which the sign of the difference between the pressure P2-4/B in the the 2-4 brake (release element) 2-4/B and the pressure PH/C in the high clutch (apply element) H/C is changed, is set at a value somewhat longer than the time required for the stroke of the piston of the high clutch H/C. If the answer to this question is "YES", then it means a 3rd speed range (a) where the high clutch pressure PH/C is greater the 2-4 brake pressure P2-4/B and the program proceeds to another determination step at the point 112. This determination is as to whether or not the calculated actual gear ratio G is equal to or greater than a threshold value G3. This threshold value G3 is the 2nd gear ratio plus a predetermined value. If the answer to this question is "YES", then it means engine racing occurs because of the applied pressure and the program proceeds to the point 114 where the duty ratio of the command signal applied to the line pressure duty solenoid 23 is held at a maximum value maxD (100%) for a predetermined short time Δt and then changed to a duty ratio D3 equal to the sum of a duty ratio increase ΔD and the duty ratio D1 set when the gear shift is initiated so as to prevent the engine racing. At the point 116, a determination is made as to whether or not the count T of the timer is equal to or greater than a predetermined value T0. If the answer to this question is "YES", then it means that the gear shift has been completed and the program proceeds to the point 128. Otherwise, the program is returned to the point 116.

If the calculated actual gear ratio G is less than the threshold value G3, then the program proceeds from the point 112 to another determination step at the point 118. This determination is as to whether or not the count T of the timer is equal to or greater than the predetermined value T0. If the answer to this question is "YES", then it means that the gear shift is completed and the program proceeds to the end point 130. Otherwise, the program is returned to the point 108.

If the count t of the timer is less than the reference value $T_{2-3}$, then it means that a 2nd speed range (b) where the 2-4 brake pressure P2-4/B is greater than the high clutch pressure PH/C and the program proceeds to another determination step at the point 120. This determination is as to whether or not the calculated actual gear ratio G is equal to or greater than the threshold value G3. If the answer to this question is "YES", then it means the tendency toward engine racing because of the released pressure and the program proceeds to the point 122 where the duty ratio of the command signal applied to the 2-4/B duty solenoid 24 is held at a maximum value maxD (100%) for a predetermined short time Δt and then changed to a duty ratio D4 equal to the sum of a duty ratio increase ΔD and the duty ratio D2 set when the gear shift is initiated so as to cese the engine racing. At the point 124, a determination is made as to whether or not the count T of the timer is equal to or greater than the predetermined value T0. If the answer to this question is "YES", then it means that the gear shift has been completed and the program proceeds to the point 128. Otherwise, the program is returned to the point 124.

If the calculated actual gear ratio G is less than the threshold value G3, then the program proceeds from the point 120 to another determination step at the point 126. This determination is as to whether or not the count T of the timer is equal to or greater than the predetermined value T0. If the answer to this question is "YES", then it means that the gear shift is completed and the program proceeds to the end point 130. Otherwise, the program is returned to the point 108.

At the point 128 in the program, the last duty ratio D1 is updated by a new duty ratio D1 which is calculated by adding a duty ratio increase ΔD' to the last duty ratio D1. The new duty ratio D1 is used for the next 2-3 upshift control. It is to be understood that the duty ratio increase ΔD by which the duty ratios D1 and D2 are increased when the engine racing is detected is a relatively great value sufficient to prevent the existing engine racing, whereas the duty ratio increase ΔD' by which the duty ratios D1 and D2 are increased for the next 2-3 shift control is intended to prevent engine racing and is smaller than the duty ratio increase ΔD. Following this, the program proceeds to the end point 130.

Figures 8A, 8B:
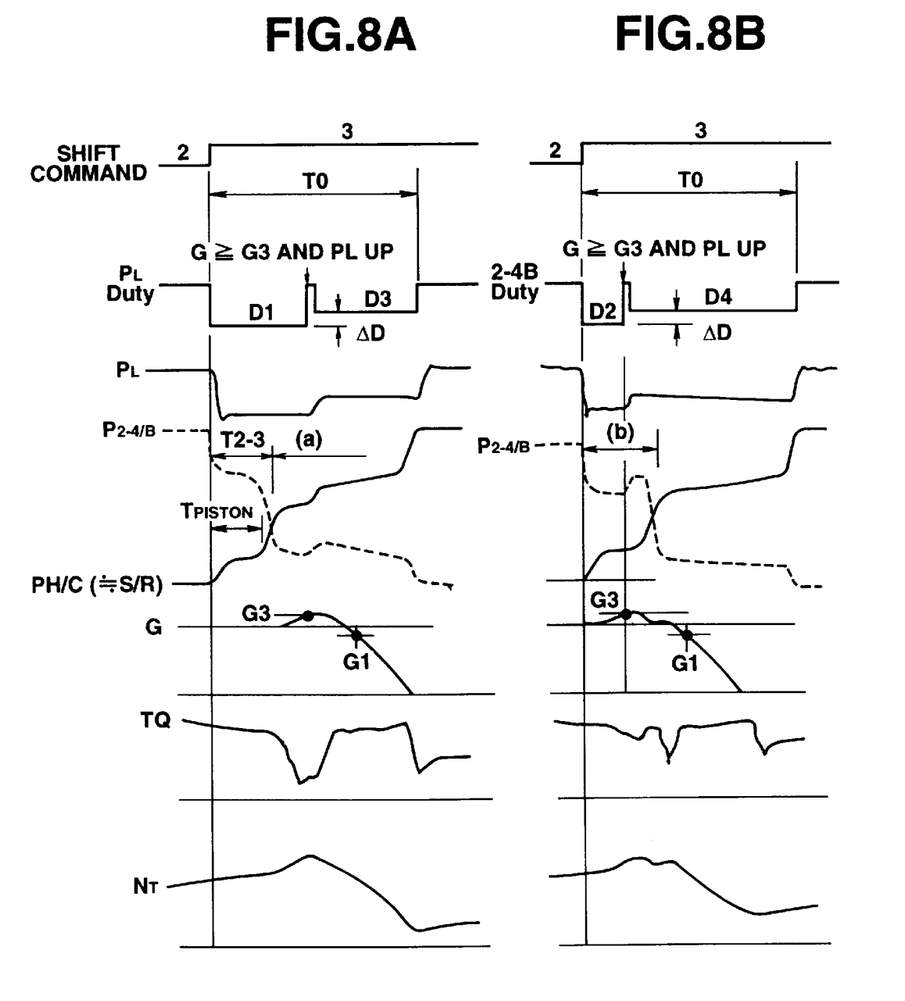
FIG. 8A contains graphs showing the transient characteristics of various conditions monitored in the automatic transmission during the engine racing prevention control made in the 3rd speed range.
FIG. 8B contains graphs showing the transient characteristics of various conditions monitored in the automatic transmission during the engine racing prevention control made in the 2ns speed range.

Referring to FIG. 8, the 2-3 upshift control will be described further. In response to a command produced for a 2-3 upshift when the vehicle speed increases with the accelerator pedal being depressed, the command signal to the second shift solenoid 22 is changed from its ON state to its OFF state so that the high clutch H/C is connected to the D range pressure supply side and the 2-4 brake 2-4/B is connected to the drain side. The shift control system prevent the engine racing in the 3rd speed range (a) by increasing the back pressure of the high clutch accumulator 11 provided on the way to the high clutch H/C so as to increase the torque capacity of the high clutch H/C (apply element). The shift control system prevent the engine racing in the 2nd speed range (b) by increasing the back pressure of the 2-4 brake accumulator 10 so as to increase the torque capacity of the 2-4 brake 2-4/B (release element).

Description will be made further on the engine racing prevention control made in the 3rd speed range (a) where the piston of the high clutch H/C strokes, after a 2-3 upshift is commanded, to start the 2-3 upshift with the 2-4 brake 2-4/B having its torque capacity decreased and the high clutch H/C having its torque capacity increased. Because of a reduction in the high clutch pressure PH/C resulting from fluid pressure variations, a high clutch friction coefficient reduction and/or an engine torque increase in such a 3rd speed range (a), the torque capacity of the high clutch H/C would decrease to a level insufficient to change the engine rotation to the 3rd speed and also insufficient to retain the engine rotation at the 2nd speed, causing the engine to race. When the engine is racing, the turbine speed increases and the actual gear ratio G increases. It is, therefore, possible to detect engine racing when G≧G3 where G3 is a threshold value greater than the 2nd gear ratio. In this case, the duty ratio of the command signal to the line pressure duty solenoid 23 is increased from D1 to D3 to increase the supply of accumulator control pressure PACCMA to the back pressure chamber of the high clutch accumulator 11 so as to increase the torque capacity of the high clutch H/C and decrease the engine speed to such a degree as to prevent the engine racing. This is effective to avoid a 2-3 upshift with engine racing which may provide a degraded feel to the operator and cause a degraded acceleration performance. Furthermore, this is effective to prevent the high clutch H/C (apply element) from having an insufficient torque capacity causing the time required for the 2-3 upshift to increase and also avoid "shelf-off" causing shock during the 2-3 upshift.

Since the duty ratio of the command signal to the line pressure duty solenoid 23 is set at a maximum value maxD for a short time Δt in the initial stage of the high clutch capacity increasing control, it is possible to ensure a good high clutch pressure increasing response. The short time Δt is set in such a manner as to avoid overshoot. The duty ratio D1 is updated by adding a predetermined value ΔD' to prevent engine racing during the next 2-3 upshift. This is effective to increase the capacity of the high clutch H/C in advance for the 2-3 upshift so as to prevent engine racing without increasing the high clutch apply pressure during the 2-3 upshift.

Description will be made further on the engine racing prevention control made in the 2nd speed range (b) where the piston of the high clutch H/C strokes, after a 2-3 upshift is commanded, to start the 2-3 upshift with the 2-4 brake 2-4/B having its torque capacity decreased but held greater than the capacity of the high clutch H/C. Because of a reduction in the 2-4 brake pressure P2-4/B resulting from fluid pressure variations, a 2-4 brake friction coefficient reduction and/or an engine torque increase in such a 2nd speed range (b), the torque capacity of the 2-4 brake 2-4/B would decrease to a level insufficient to retain the engine rotation at the 2nd speed, causing the engine to race. When the engine is racing, the turbine speed increases and the actual gear ratio G increases. It is, therefore, possible to detect engine racing when $G \geq G3$ where G3 is a threshold value greater than the 2nd gear ratio. In this case, the duty ratio of the command signal to the 2-4/B duty solenoid 24 is increased from D2 to D4 to increase the supply of accumulator control pressure PACCMB to the back pressure chamber of the 2-4 brake accumulator 10 so as to increase the torque capacity of the 2-4 brake 2-4/B and decrease the engine speed to such a degree as to prevent the engine racing. This is effective to avoid a 2-3 upshift with engine racing which may provide a degraded feel to the operator and cause a degraded acceleration performance. Furthermore, this is effective to prevent the 2-4 brake 2-4/B (release element) from having an insufficient torque capacity causing the time required for the 2-3 upshift to increase and also avoid "shelf-off" causing shock during the 2-3 upshift.

Since the duty ratio of the command signal to the 2-4 brake duty solenoid 24 is set at a maximum value maxD for the short time $\Delta t$ in the early stage of the 2-4 brake capacity increasing control, it is possible to ensure a good 2-4 brake pressure increasing response. The duty ratio D2 is updated by adding the predetermined value $\Delta D'$ to prevent engine racing during the next 2-3 upshift. This is effective to increase the torque capacity of the 2-4 brake in advance for the 2-3 upshift so as to prevent engine racing without increasing the 2-4 brake apply pressure during the 2-3 upshift.

The above described upshift control apparatus provides the following development advantages: First, it responds to detection of engine racing in the early stage of a 2-3 upshift after the 2-3 upshift is commanded and before the inertia phase by increasing the pressure in the high clutch to prevent the engine racing. Since the engine racing can be suppressed in the early stage of the upshift, the upshift can be effected smoothly with almost no shock. Secondly, when engine racing is detected during a 2-3 upshift, the pressures in the high clutch are increased to prevent the existing engine racing. After such an engine racing prevention control, the pressures D1 and D2 are updated by adding an increase $\Delta D$ to the pressures D1 and D2. The updated pressure D1 and D2 are used for the next 2-3 upshift. It is, therefore, possible to ensure that the next 2-3 upshift can be effected without engine racing from the start of the next 2-3 upshift. Thirdly, the torque capacity is increased separately before and after the sign of the difference between the released side 2-4 brake pressure P2-4/B and the engaged side high clutch pressure PH/C is changed. It is, therefore, possible to judge whether the cause of the engine racing is caused by an insufficient torque capacity of the engaged side high clutch H/C or the insufficient torque capacity of the released side 2-4 brake 2-4/B and to suppress the engine racing in a manner appropriate for either of these cases. Fourthly, the maximum duty ratio maxD is outputted only for a short time at the start of increase of the engaging pressure. It is, therefore, possible to increase the engaging pressure at a rapid response rate.

While the invention has been described in connection with an engine racing control made separately for each of the applied and released pressure ranges, it is to be understood that the engine racing prevention control may be made by including the pressure to the first and second (release and apply) elements at the same time when engine racing is detected. In this case, the invention is applicable to a system where a single line pressure solenoid is used to control all of the friction elements. Since the applied and released pressures are increased for the next upshift operation with the learned engaging pressure adjustment, it is also possible to suppress engine racing caused by an insufficient torque capacity of the release element.

While the invention has been described in connection with a 2-3 upshift, it is to be understood that the invention is also applicable to a 3-4 upshift effected by releasing the low clutch L/C and engaging the 2-4 brake 2-4/B. While the invention has been described in connection with an engaging pressure control made with accumulator back pressure adjustment, it is to be understood that the clutch and brake engaging pressures may be controlled directly. While the invention has been described in connection with a two solenoid system, it is to be understood that the invention is applicable to a single solenoid system, as described previously, and also to a multi-solenoid system where the pressures to the respective friction elements are controlled separately.

The invention is directed to an upshift control apparatus for use in an automatic transmission having an input shaft drivingly coupled to an engine and first and second torque transmitting elements operable on fluid pressure between engaged and released conditions for controlling at least the fluid pressure to the second element to an initial value to engage the second element to effect an upshift from a current gear ratio to a higher traget gear ratio while releasing the first element without the use of a one-way clutch to release the first element while synchronizing rotation.

According to the invention, the upshift control apparatus comprises means for detecting an upshift in the transmission, means for detecting the gear ratio changing during the upshift, means operable after the upshift is detected for detecting engine racing when the detected gear ratio is equal to or greater than a threshold value greater than a gear ratio existing before the upshift, and engine racing prevention means for increasing the fluid pressure supplied to the second element to prevent the engine racing when the engine racing is detected at an early stage of the upshift before an inertia phase of the upshift. It is, therefore, possible to suppress engine racing in the early stage of upshift operation to minimize shock and provide a good shift feel during shifting.

Preferably, the upshift control apparatus further includes means for adding an increase to the initial value to update the initial value after the upshift is completed when the fluid pressure supplied to the second element is increased to prevent the engine racing. It is, therefore, possible to prevent engine racing from the start of the upshift operation subsequent to an upshift operation of the same mode where the engine racing prevention control was made.

Preferably, the engine racing prevention means includes means for producing a first signal at the early stage of the upshift when the second element has a torque capacity equal to or greater than that of the first element and a second signal at the early stage of the upshift when the second element has a torque capacity less than that of the first element, means for increasing the fluid pressure supplied to the second element in response to the first signal and for increasing the fluid pressure supplied to the first element in response to the second signal. It is, therefore, possible to provide an appropriate engine racing prevention control according to whether the apply or release element has an insufficient torque capacity.

Preferably, the upshift control apparatus includes means responsive to a control signal having a duty ratio for controlling the fluid pressure to the second element, and the engine racing prevention means includes means for setting the duty ratio at a maximum value so as to increase the fluid pressure supplied to the second element to prevent the engine racing when the engine racing is detected at the early stage of the upshift. It is, therefore, possible to increase the engaging pressure at a rapid response rate during the engine racing prevention control.

Preferably, the engine racing prevention means includes means for increasing the fluid pressure to the first element while at the same time increasing the fluid pressure to the second element when the engine racing is detected at the early stage of the upshift. It is, therefore, possible to applied to a system where a single control means is used to control all of the friction elements and can suppress engine racing resulting from an insufficient torque capacity of a release element when a learned engaging pressure adjustment is effected.

What is claimed is:

1. An upshift control apparatus for use in an automatic transmission having an input shaft drivingly coupled to an engine and first and second torque transmitting elements operable on fluid pressure between engaged and released conditions for controlling at least the fluid pressure to the second element to an initial value to engage the second element to effect an upshift from a current gear ratio to a higher target gear ratio while releasing the first element without the use of a one-way clutch to release the first element while synchronizing rotation, comprising:

means for detecting an upshift in the transmission;

means for detecting the gear ratio changing during the upshift;

means operable after the upshift is detected for detecting engine racing when the detected gear ratio is equal to or greater than a threshold value greater than a gear ratio existing before the upshift; and engine racing prevention means for increasing the fluid pressure supplied to the second element to prevent the engine racing when the engine racing is detected at an early stage of the upshift before an inertia phase of the upshift.

2. The upshift control apparatus as claimed in claim 1, wherein the engine racing prevention means includes means for producing a first signal at the early stage of the upshift when the second element has a torque capacity equal to or greater than that of the first element and a second signal at the early stage of the upshift when the second element has a torque capacity less than that of the first element, and means for increasing the fluid pressure supplied to the second element in response to the first signal and for increasing the fluid pressure supplied to the first element in response to the second signal.

3. The upshift control apparatus as claimed in claim 2, further including means responsive to a first control signal having a first duty ratio for controlling the fluid pressure to the second element, and means responsive to a second control signal having a second duty ratio for controlling the fluid pressure to the first element, and wherein the engine racing prevention means includes means responsive to the first signal for setting the first duty ratio at a maximum value so as to increase the fluid pressure supplied to the second element to prevent the engine racing when the engine racing is detected at the early stage of the upshift, and means responsive to the second signal for setting the second duty ratio at a maximum value so as to increase the fluid pressure supplied to the first element to prevent the engine racing when the engine racing is detected at the early stage of the upshift.

4. The upshift control apparatus as claimed in claim 1, further including means responsive to a control signal having a duty ratio for controlling the fluid pressure to the second element, and wherein the engine racing prevention means includes means for setting the duty ratio at a maximum value so as to increase the fluid pressure supplied to the second element to prevent the engine racing when the engine racing is detected at the early stage of the upshift.

5. The upshift control apparatus as claimed in claim 1, wherein the engine racing prevention means includes means for increasing the fluid pressure to the first element while at the same time increasing the fluid pressure to the second element when the engine racing is detected at the early stage of the upshift.

6. The upshift control apparatus as claimed in claim 1, further including means for adding an increase to the initial value to update the initial value after the upshift is completed when the fluid pressure supplied to the second element is increased to prevent the engine racing.

7. The upshift control apparatus as claimed in claim 6, wherein the engine racing prevention means includes means for producing a first signal at the early stage of the upshift when the second element has a torque capacity equal to or greater than that of the first element and a second signal at the early stage of the upshift when the second element has a torque capacity less than that of the first element, and means for increasing the fluid pressure supplied to the second element in response to the first signal and for increasing the fluid pressure supplied to the first element in response to the second signal.

8. The upshift control apparatus as claimed in claim 6, further including means responsive to a control signal having a duty ratio for controlling the fluid pressure to the second element, and wherein the engine racing prevention means includes means for setting the duty ratio at a maximum value so as to increase the fluid pressure supplied to the second element to prevent the engine racing when the engine racing is detected at the early stage of the upshift.

9. The upshift control apparatus as claimed in claim 6, wherein the engine racing prevention means includes means for increasing the fluid pressure to the first element while at the same time increasing the fluid pressure to the second element when the engine racing is detected at the early stage of the upshift.

* * * * *